United States Patent
Barbas et al.

(10) Patent No.: US 12,455,970 B2
(45) Date of Patent: Oct. 28, 2025

(54) PRIVACY PRESERVING AND HIGH PERFORMANCE DATA CLUSTERING

(71) Applicant: INTERNATIONAL BUSINESS MACHINES CORPORATION, Armonk, NY (US)

(72) Inventors: Pedro Miguel Barbas, Dunboyne (IE); Deepak Kulkarni, Hyderabad (IN); Christian Cesar Bones, Sao Carlos (BR); Guilherme Rodrigues de Abreu, Campinas (BR); Rodrigo Cravo Dorea Arnez, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 18/340,935

(22) Filed: Jun. 26, 2023

(65) Prior Publication Data
US 2024/0427907 A1    Dec. 26, 2024

(51) Int. Cl.
*G06F 21/60*    (2013.01)
*G06F 18/23213*    (2023.01)
*G06F 40/12*    (2020.01)

(52) U.S. Cl.
CPC ........ *G06F 21/60* (2013.01); *G06F 18/23213* (2023.01); *G06F 40/12* (2020.01)

(58) Field of Classification Search
CPC ..... G06F 21/60; G06F 18/23213; G06F 40/12
See application file for complete search history.

(56) References Cited

U.S. PATENT DOCUMENTS

| | | | |
|---|---|---|---|
| 2005/0062765 A1* | 3/2005 | Hudson | G09G 3/2022 345/692 |
| 2007/0250522 A1 | 10/2007 | Perrizo | |
| 2021/0019556 A1 | 1/2021 | Ganguly | |

FOREIGN PATENT DOCUMENTS

CN    108154185 B    12/2021

OTHER PUBLICATIONS

Biswas et al., Privacy Preserving Approximate K-means Clustering, 2019 Association for Computing Machinery. Manuscript submitted to ACM, See discussions, stats, and author profiles for this publication at: https://www.researchgate.net/publication/337017748, 19 pages.

Le et al., A Binary Optimization Approach for Constrained K-Means Clustering, Retreived from Internet: https://arxiv.org/pdf/1810.10134.pdf, Oct. 29, 2018, 16 pages.

(Continued)

*Primary Examiner* — Abdulkader M Alriyashi
(74) *Attorney, Agent, or Firm* — Harrity & Harrity, LLP

(57) ABSTRACT

A method, computer program product, and computer system for clustering data objects. Data objects are accessed. The data objects are sorted. The data objects are transformed into binary words. The binary words are encoded into blocks, using the sorted data objects. Block clusters are generated from the blocks. The block clusters are converted into word clusters. For each word cluster, the word cluster is reconfigured into L word clusters in a manner that minimizes a total number of binary word deviations in the L word clusters, wherein L is at least 1.

20 Claims, 11 Drawing Sheets

Method for clustering data objects

(56) References Cited

OTHER PUBLICATIONS

Stanley Robson De Medeiros Oliveira et al., Privacy-Preserving Clustering by Object Similarity-Based Representation and Dimensionality Reduction Transformation, See discussions, stats, and author profiles for this publication at: https://www.researchgate.net/publication/228765056, Jan. 2004, 11 pages.

Behnaz Merikhi et al., Automatic Data Clustering Framework Using Nature-Inspired Binary Optimization Algorithms, Received Mar. 27, 2021, accepted Jun. 12, 2021, date of publication Jun. 21, 2021, date of current version Jul. 7, 2021.Digital Object Identifier 10.1109/ACCESS.2021.3091397, 20 pages.

Zhang et al., Binary Multi-View Clustering, IEEE Transactions on Pattern Analysis and Machine Intelligence, vol. 41, No. 7, Jul. 2019, 9 pages.

Farag et al., Binary-Real Coded Genetic Algorithm Based k-Means Clustering for Unit Commitment Problem, Applied Mathematics, 2015, 6, 1873-1890 Published Online Oct. 2015 in SciRes. Retrieved from Internet: http://www.scirp.org/journal/am; http://dx.doi.org/10.4236/am.2015.611165, 18 pages.

Jiehua Chen et al., On Computing Centroids According to the p-Norms of Hamming Distance Vectors, Published in Embedded Systems and Applications, Jul. 17, 2018 arXiv:1807.06469v3 [cs.CC] Jun. 26, 2019, 21 pages.

Mohassel, et al., Practical Privacy-Preserving K-means Clustering, sciendo, Proceedings on Privacy Enhancing Technologies ; 2020 (4):414-433, 20 pages.

Nanda et al., "A New Density Based Clustering Algorithm for Binary Data Sets", 2014 International Conference on High Performance Computing and Applications (ICHPCA), Dec. 22-24, 2014, 06 pages.

\* cited by examiner

FIG. 1 Method for clustering data objects

FIG. 2  Transform data objects into binary words

FIG. 3 Encoding data objects into blocks

FIG. 4 Generate block clusters

FIG. 5  Determine cluster centers for block clusters

FIG. 6 Distribute R remaining blocks into M block clusters

FIG. 7 Convert block clusters to word clusters

FIG. 8  Reconfigure word clusters

FIG. 9  Determine minimum Hamming distance of word cluster

PRIVACY PRESERVING AND HIGH PERFORMANCE DATA CLUSTERING

BACKGROUND

The present invention relates to clustering data, and more specifically, to clustering data with improved data security and privacy preservation and performance.

SUMMARY

Embodiments of the present invention provide a method, a computer program product, and a computer system, for determining keywords from raw data.

One or more processors of a computer system access a set of data objects arranged in an initial sequential order, wherein the set of data objects consists of S data objects wherein S is at least 2, wherein each data object includes a code and a score, wherein each code represents an instance of the data object and each code is a positive integer subject to the codes collectively consisting of positive integers 1, 2, . . . , N subject to N≤S, wherein each score is a positive real number denoting a measure of a parameter pertaining to the instance that is represented by the code, wherein the scores collectively consist of B unique scores subject to B≤S.

The one or more processors sort the data objects using the score as a sort key to rearrange the data objects in an ascending order of the score, wherein each unique score has a sequence number in the sorted data objects, resulting in B consecutive sequence numbers.

The one or more processors transform the S data objects into respective S binary words, wherein each binary word corresponding to a data object of the S data objects consists of B bits characterized by: (i) a 1 bit in a bit position of the binary word corresponding to the sequence number of the sorted unique score comprised by the data object and (ii) a 0 bit in all other bit positions of the binary word.

The one or more processors encode the S data objects into a sequence of N blocks, wherein each block consists of B bits in a binary format, and wherein the N blocks are sequenced and have bit configurations that depend on the initial sequential order of the data objects and the sequence numbers of the sorted unique scores.

The one or more processors generate from the N blocks, M block clusters respectively comprising M respective cluster centers, wherein each cluster center is a different block of the N blocks, wherein R remaining blocks of the N blocks are distributed into the M block clusters in a manner that minimizes a weighted bit separation distance between each of the R remaining blocks and each of the M cluster centers, wherein M+R=N, and wherein 2<M<N.

The one or more processors convert the M block clusters of binary blocks into respective M word clusters of binary words, wherein the S binary words are distributed into the M binary word clusters.

For each word cluster of the M word clusters having J binary words in each word cluster, the one or more processors reconfigure the M word cluster into L word clusters into which the J binary words are distributed, by minimizing a total number of deviations in the L word clusters, wherein L is at least 1.

DETAILED DESCRIPTION

Figure 1:
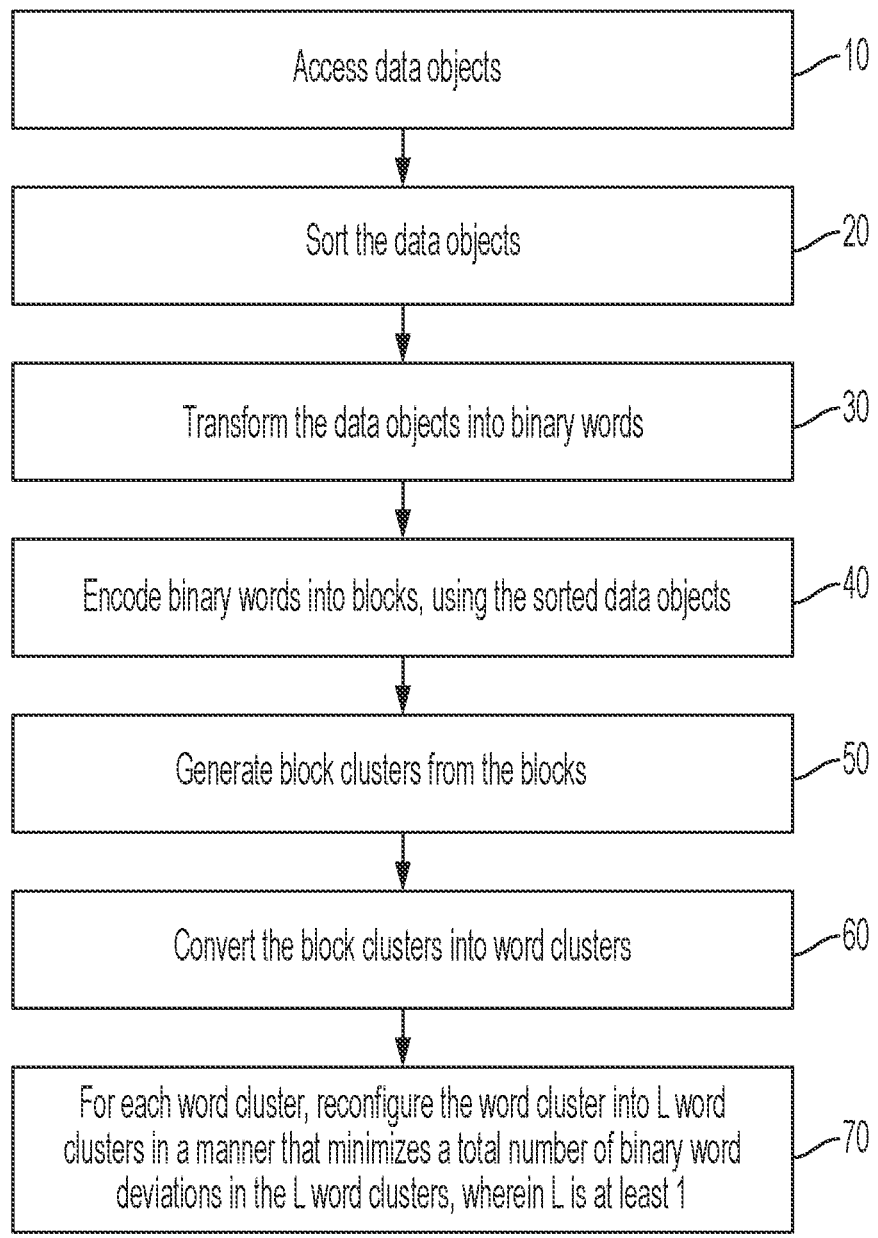
FIG. 1 is a flow chart of a method for clustering data objects, in accordance with embodiments of the present invention.

Today's enterprises generate a large amount of data where the majority of the data are not associated with any labels. One way of dealing with these data objects is to classify or group the data objects into clusters. Clustering of data objects involves creating groups of data objects that are similar and groups of data objects that are dissimilar. Thus, the clustering problem lies in finding groups of similar objects in the data. Currently, a similarity between the data objects may be measured with the use of a similarity function (e.g., a cosine similarity function).

Clustering algorithms can be applied in, inter alia, finance, marketing, biology, libraries, insurance, city-planning, earthquakes, document classification, etc.

Embodiments of the present invention provide a high-performance clustering technique that takes into consideration data security and privacy preserving requirements such that an input dataset is initially encoded into a strategic divide and conquer binary filter configured as binary blocks.

Embodiments of the present invention provide a binary encoding scheme optimized for maximum efficiency and performance through a divide and conquer design strategy (S×B×bit per blocks per bucket scheme). As such, the binary encoding design is consistently aligned with the remaining calculations of the technique, assuring that the same level of performance and efficiency is constant even if the data grows exponentially. In contrast with the state-of-the-art framework, the method of the present invention leverages the binary encoding scheme design to employ highly effective intra-cluster distance calculations, with cluster centroids bound on the p-norm of its distances and recomputed deviations. The present invention does not have any of the problems of the state-of-the-art technique.

Embodiments of the present invention provide a clustering solution that requires no prior knowledge of the number of clusters and is based on re-clustering, merging, and modifying small clusters to compensate for a distortion gap between cluster groups with different sizes.

Embodiments of the present invention remove data security and privacy limitations by processing data derived from the original data but not processing the original data itself. In contrast, state-of-the-art clustering techniques require processing the original data.

Embodiments of the present invention remove drastically unaffordable computational time and storage requirement limitations in contrast with state-of-the-art clustering techniques.

Embodiments of the present invention remove limitations, which are required in state-of-the-art clustering techniques, of knowing a-priori the total number of cluster centroids.

Embodiments of the present invention are able to detect deviations in a novel, unobvious, and efficient manner. A deviation is a data point in a cluster that is an outlier and therefore should not be in the cluster.

Embodiments of the present invention are easy to implement and work with any of the standard distance norms.

Embodiments of the present invention allow straightforward parallelization and are insensitive with respect to input data ordering.

FIG. 1 is a flow chart of a method for clustering data objects, in accordance with embodiments of the present invention. The flow chart of FIG. 1 includes steps 10-70.

Step 10 accesses a set of data objects arranged in an initial sequential order. The set of data objects consists of S data objects wherein $S \geq 2$.

The set of data items are from a class of data items such as, inter alia, documents, video files, audio files, databases, spreadsheets, geographic data, economic data, sensor data, time series, data, social media posts, genetic sequences (e.g., DNA or RNA sequences), etc. Each data object includes a code and a score.

Each code represents an instance of the data object, and each code is a positive integer subject to the codes collectively consisting of positive integers 1, 2, ..., N subject to $N \leq S$. Thus, the set of data items includes N unique codes.

Each score is a positive real number denoting a measure of a parameter pertaining to the instance of the data object that is represented by the code.

The scores collectively consist of B unique scores subject to $B \leq S$.

For example, if the data objects are documents, the codes may represent historical documents, novels, poems, document subject, etc., and the score may be a number of words in the document, a number of pages in the document, a number of authors of the document, a number of readers of the document, a rating of the document, a number of sales over the past three months of the document, etc.

TABLE 1

| Data object input set | | |
| --- | --- | --- |
| Data Object Sequence No. | Data Object Code | Data Object Score |
| 1 | 2 | 10 |
| 2 | 2 | 5 |
| 3 | 7 | 4 |
| 4 | 4 | 9 |
| 5 | 6 | 6 |
| 6 | 5 | 4 |

TABLE 1-continued

| Data object input set | | |
| --- | --- | --- |
| Data Object Sequence No. | Data Object Code | Data Object Score |
| 7 | 1 | 3 |
| 8 | 3 | 5 |

Table 1 depicts an input set of 8 data items (1, 2, 3, 4, 4, 6, 7 8). Thus, S=8. Each data item is characterized by a code and a score as shown.

Each code is a positive integer subject to the codes collectively consisting of all consecutive positive integers in a range of 1 to N.

There are 7 unique codes (1, 2, 3, 4, 5, 6, 7). Thus, N=7.
There are 6 unique scores (3, 4, 5, 6, 9, 10). Thus B=6.

Step 20 sorts the data objects using the score as a sort key to rearrange the data objects in an ascending order of the score. Each unique score has a sequence number in the sorted data objects, resulting in B consecutive sequence numbers.

TABLE 2

| Sorted data object input set | | | |
| --- | --- | --- | --- |
| Data Object Sequence No. | Data Object Code | Data Object Score | Unique Score Sequence No. |
| 7 | 1 | 3 | 1 |
| 6 | 5 | 4 | 2 |
| 3 | 7 | 4 | 2 |
| 2 | 2 | 5 | 3 |
| 8 | 3 | 5 | 3 |
| 5 | 6 | 6 | 4 |
| 4 | 4 | 9 | 5 |
| 1 | 2 | 10 | 6 |

Table 2 is Table 1 with the data objects sorted using the score as a sort key so that the data items are arranged in ascending order of the score as shown, and Table 2 has an added Score Sequence Number column. Each unique score in Table 2 (3, 4, 5, 6, 9, 10) has a respective unique score sequence number (1, 2, 3, 4, 5, 6) indicated in the added Score Sequence Number column, resulting in B consecutive sequence numbers (i.e., 6 consecutive sequence numbers of 1, 2, 3, 4, 5, 6).

Step 30 transforms the S data objects into respective S binary words, wherein each binary word corresponding to a data object of the S data objects consists of B bits characterized by: (i) a 1 bit in a bit position of the binary word corresponding to the sequence number of the sorted unique score comprised by the data object and (ii) a 0 bit in all other bit positions of the binary word. An algorithm for performing step 30 is presented in FIG. 2, discussed infra

TABLE 3

| Sorted data object input set with added data object binary word | | | | |
| --- | --- | --- | --- | --- |
| Data Object Sequence No. | Data Object Code | Data Object Score | Unique Score Sequence No. | Data Object Binary Word |
| 7 | 1 | 3 | 1 | 100000 |
| 6 | 5 | 4 | 2 | 010000 |
| 3 | 7 | 4 | 2 | 010000 |
| 2 | 2 | 5 | 3 | 001000 |
| 8 | 3 | 5 | 3 | 001000 |
| 5 | 6 | 6 | 4 | 000100 |

TABLE 3-continued

Sorted data object input set with added data object binary word

| Data Object Sequence No. | Data Object Code | Data Object Score | Unique Score Sequence No. | Data Object Binary Word |
|---|---|---|---|---|
| 4 | 4 | 9 | 5 | 000010 |
| 1 | 2 | 10 | 6 | 000001 |

Table 3 is Table 2 with an added Data Object Binary Word column. The binary word is a binary representation of the data object.

As shown, each binary word has (i) a 1 bit in a bit position of the binary word corresponding to the sequence number of the sorted unique score comprised by the data object and (ii) a 0 bit in all other bit positions of the binary word, which corresponds to code 1.

For example, unique data object score 3 has associated score sequence number 1, resulting in a 1 bit in bit position 1 in the binary word 100000, which corresponds to code 1.

As another example, unique data object score 4 has associated score sequence number 2, resulting in a 1 bit in bit position 2 in the binary word 010000, which corresponds to codes 5 and 7.

Figure 2:
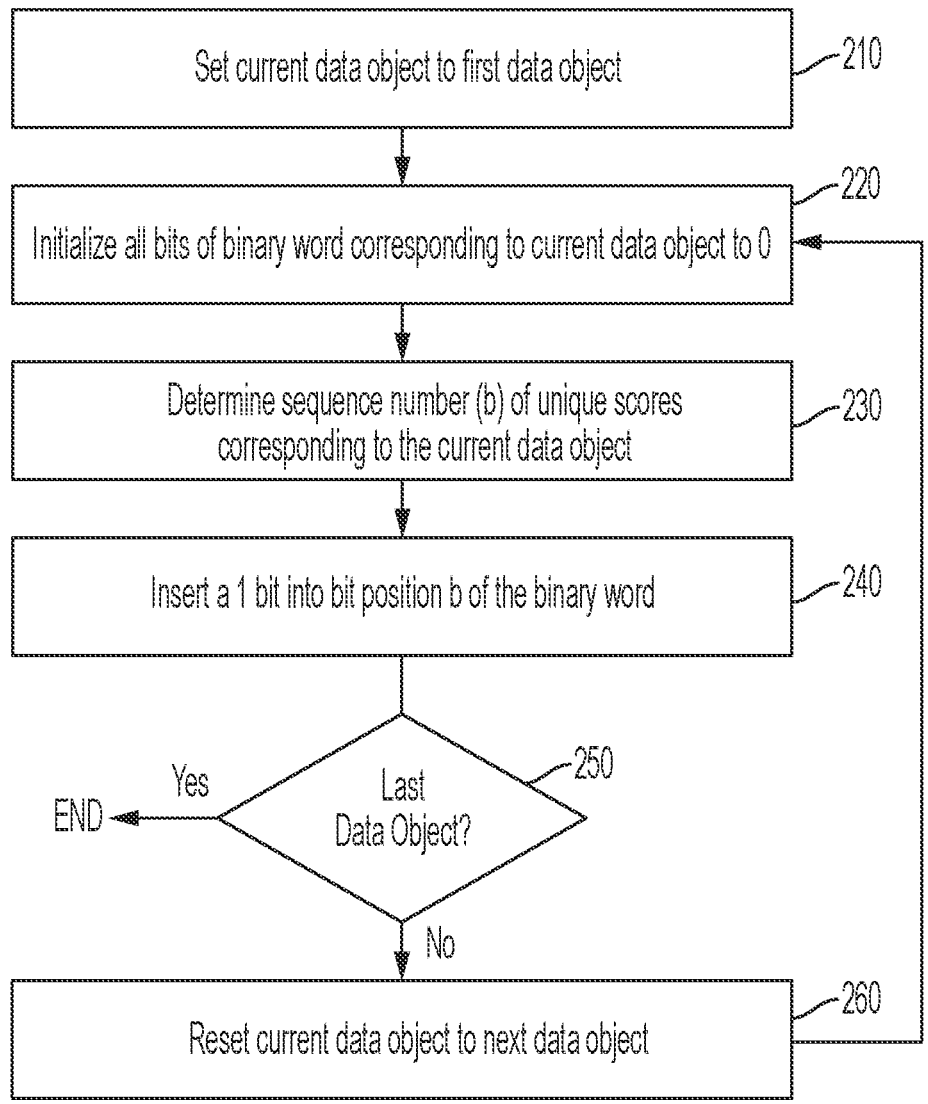
FIG. 2 is a flow chart that describes a process of transforming data objects into binary words, in accordance with embodiments of the present invention.

FIG. 2 is a flow chart that describes a process of transforming data objects into binary words, in accordance with embodiments of the present invention. The process of FIG. 2 includes steps 210-260 and describes step 30 of FIG. 1 in more detail.

The process of FIG. 2 iterates over the data objects with one data object being processed in each iteration. The resulting binary words are independent of the order in which the data objects are processed.

Step 210 initializes a current data object to the first data object.

Each iteration begins at step 220.

Step 220 initializes all bits of the binary word corresponding to the current data object to 0.

Step 230 determines the sequence number (b) of the unique score corresponding to the current data object.

Step 240 inserts a 1 bit onto position b of the binary word.

Step 250 determines whether the current data object is the last data object, and if so the process of FIG. 2 ends, and if not step 260 resets the current data object to the next data object and the next iteration is performed starting at step 220.

In Table 3, the first data object is defined by data object sequence number 7 corresponding to unique score sequence number 1. Accordingly, after the binary word is initialized to 000000, a 1 bit is inserted into the binary word at bit position 1 and the binary word becomes 100000.

The second data object in Table 3 is defined by data object sequence number 6 corresponding to unique score sequence number 2. Accordingly, after the binary word is initialized to 000000, a 1 bit is inserted into the binary word at bit position 2 and the binary word becomes 010000.

The third data object in Table 3 is defined by data object sequence number 3 corresponding to unique score sequence number 2. Accordingly, after the binary word is initialized to 000000, a 1 bit is inserted into the binary word at bit position 2 and the binary word becomes 010000.

The fourth data object in Table 3 is defined by data object sequence number 2 corresponding to unique score sequence number 3. Accordingly, after the binary word is initialized to 000000, a 1 bit is inserted into the binary word at bit position 3 and the binary word becomes 001000.

The fifth data object in Table 3 is defined by data object sequence number 8 corresponding to unique score sequence number 3. Accordingly, after the binary word is initialized to 000000, a 1 bit is inserted into the binary word at bit position 3 and the binary word becomes 001000.

The sixth data object in Table 3 is defined by data object sequence number 5 corresponding to unique score sequence number 4. Accordingly, after the binary word is initialized to 000000, a 1 bit is inserted into the binary word at bit position 4 and the binary word becomes 000100.

The seventh data object in Table 3 is defined by data object sequence number 4 corresponding to unique score sequence number 5. Accordingly, after the binary word is initialized to 000000, a 1 bit is inserted into the binary word at bit position 5 and the binary word becomes 000010.

The eighth data object in Table 3 is defined by data object sequence number 1 corresponding to unique score sequence number 6. Accordingly, after the binary word is initialized to 000000, a 1 bit is inserted into the binary word at bit position 6 and the binary word becomes 000001.

Returning to FIG. 1, step 40 encodes the S data objects into a sequence of N blocks, wherein each block consists of B bits in a binary format, wherein the N blocks are sequenced and have bit configurations that depend on the data object codes and the unique score sequence numbers of the sorted unique scores. An algorithm for performing step 40 is presented in FIG. 3, discussed infra.

Figure 3:
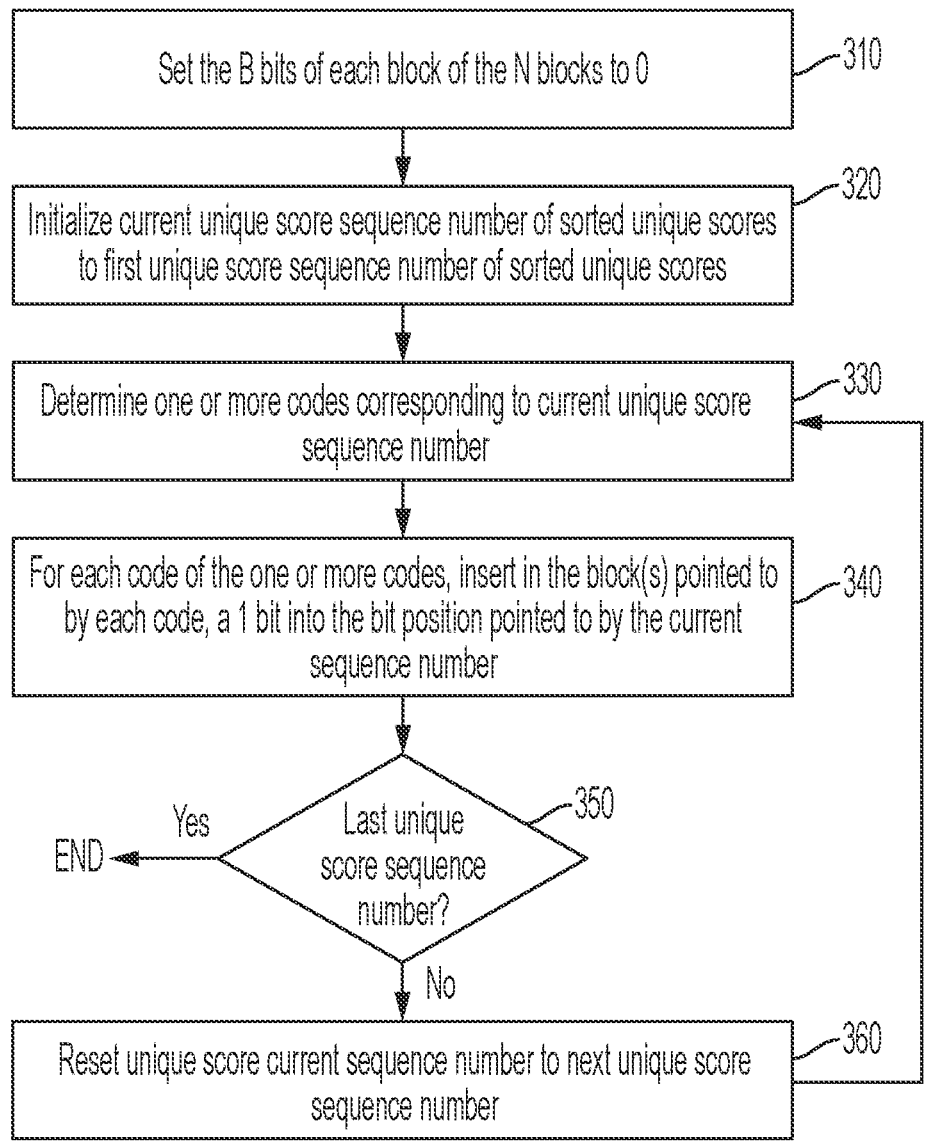
FIG. 3 is a flow chart that describes a process of encoding data objects into blocks, in accordance with embodiments of the present invention.

FIG. 3 is a flow chart that describes a process of encoding data objects into blocks, in accordance with embodiments of the present invention. The process of FIG. 3 includes steps 310-360 and describes step 40 of FIG. 1 in more detail.

The process of FIG. 3 iterates over unique score sequence numbers with one unique score sequence number being processed in each iteration.

Step 310 sets the B bits of each block of the N blocks to 0.

Step 320 initializes the current unique score sequence number of the sorted unique scores to the first unique score sequence number of the sorted unique scores.

Each iteration begins at step 330.

Step 330 determines one or more codes corresponding to current unique score sequence number.

For each code of the one or more codes, step 340 inserts, in the block(s) pointed to by each code, a 1 bit into the bit position pointed to by the current unique score sequence number.

Step 350 determines whether the current sequence number is the last sequence number, and if so the process of FIG. 3 ends, and if not step 360 resets the current unique score sequence number to the next unique score sequence number and the next iteration is performed starting at step 330.

TABLE 4

Generation of Blocks

| Unique Score Seq. No. | Data Object Code(s) | Blocks |   |   |   |   |   |   |
|---|---|---|---|---|---|---|---|---|
| | | 1 | 2 | 3 | 4 | 5 | 6 | 7 |
| Initially | | 000000 | 000000 | 000000 | 000000 | 000000 | 000000 | 000000 |
| 1 | 1 | 100000 | 000000 | 000000 | 000000 | 000000 | 000000 | 000000 |
| 2 | 5, 7 | 100000 | 000000 | 000000 | 000000 | 010000 | 000000 | 010000 |
| 3 | 2, 3 | 100000 | 001000 | 001000 | 000000 | 010000 | 000000 | 010000 |
| 4 | 6 | 100000 | 001000 | 001000 | 000000 | 010000 | 000100 | 010000 |
| 5 | 4 | 100000 | 001000 | 001000 | 000010 | 010000 | 000100 | 010000 |
| 6 | 2 | 100000 | 001001 | 001000 | 000010 | 010000 | 000100 | 010000 |

Table 4 illustrates the process of FIG. 3.

In Table 4, the first two columns, which respectively include the unique score sequence number and the associated data object codes, are derived from Table 3.

The initial blocks are set to zero (step 310).

The current unique score sequence number is initialized to the first unique score sequence number of 1 from which the code of 1 is obtained (steps 320, 330).

In the first iteration for current unique score sequence number 1, a 1 bit is inserted, into block 1 pointed to by code 1, into bit position 1 pointed to by the current unique score sequence number 1.

In the second iteration for current unique score sequence number 2, a 1 bit is inserted, into blocks 5 and 7 pointed to by codes 5 and 7, into bit position 2 pointed to by the current unique score sequence number 2.

In the third iteration for current unique score sequence number 3, a 1 bit is inserted, into blocks 2 and 3 pointed to by codes 2 and 3, into bit position 3 pointed to by the current unique score sequence number 3.

In the fourth iteration for current sequence number 4, a 1 bit is inserted, into block 6 pointed to by code 6, into bit position 4 pointed to by the current unique score sequence number 4.

In the fifth iteration for current sequence number 5, a 1 bit is inserted, into block 4 pointed to by code 4, into bit position 5 pointed to by the current unique score sequence number 5.

In the sixth iteration for current sequence number 6, a 1 bit is inserted, int0 block 2 pointed to by code 2, into bit position 6 pointed to by the current unique score sequence number 6.

TABLE 5

| Block Seq. No. | Block | Data Object Code | Unique Score Sequence No. | Data Object Binary Word(s) | Data Object (Number, Code, Score) |
|---|---|---|---|---|---|
| 1 | 100000 | 1 | 1 | 100000 | 7 (1, 3) |
| 2 | 001001 | 2 | 3 | 001000 | 2 (2, 5) |
| | | | 6 | 000001 | 1 (2, 10) |
| 3 | 001000 | 3 | 3 | 001000 | 8 (3, 5) |
| 4 | 000010 | 4 | 5 | 000010 | 4 (4, 9) |
| 5 | 010000 | 5 | 2 | 010000 | 6 (5, 4) |
| 6 | 000100 | 6 | 4 | 000100 | 5 (6, 6) |
| 7 | 010000 | 7 | 2 | 010000 | 3 (7, 4) |

Table 5, which is derived from Tables 3 and 4, shows that the N blocks (i.e., blocks 1-7 since N=7) are sequenced and have bit configurations that respectively depend on the data object codes and the sequence numbers of the sorted unique scores. Specifically, the block sequence number is equal to the data object code, and the bit position(s) of the 1 bit in each block is equal to the unique score sequence number(s).

Each block of the N blocks is weighted with a block weight, wherein block n has a block weight Wn, n=1, 2, . . . , N.

In one embodiment, the block weights are received as user input.

In one embodiment, the block weights are a pre-determined function f(n) of the block number n (e.g., $f(n)=n^q$, q being a real positive number such, inter alia, q=0.5, 1, 2, 3, etc.), for n=1, 2, . . . , N.

Returning to FIG. 1, step 50 generates, from the N blocks, M block clusters respectively comprising M respective cluster centers. Each cluster center is a different block of the N blocks. R remaining blocks of the N blocks are distributed into the M block clusters in a manner that minimizes a weighted bit separation distance between each of the R remaining blocks and each of the M cluster centers, wherein M+R=N, and wherein 2<M<N.

Figure 4:
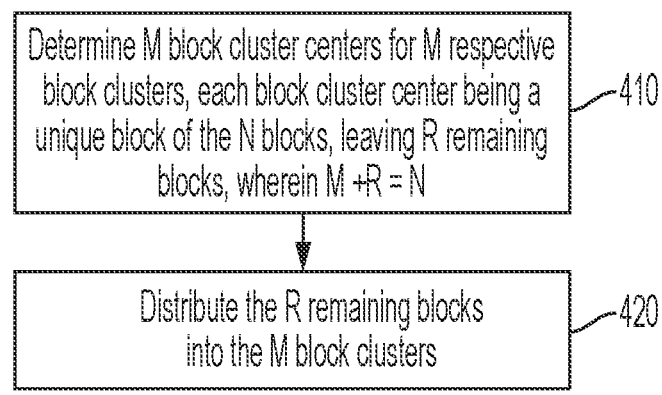
FIG. 4 is a flow chart that describes a process of generating block clusters, in accordance with embodiments of the present invention.
Figure 5:
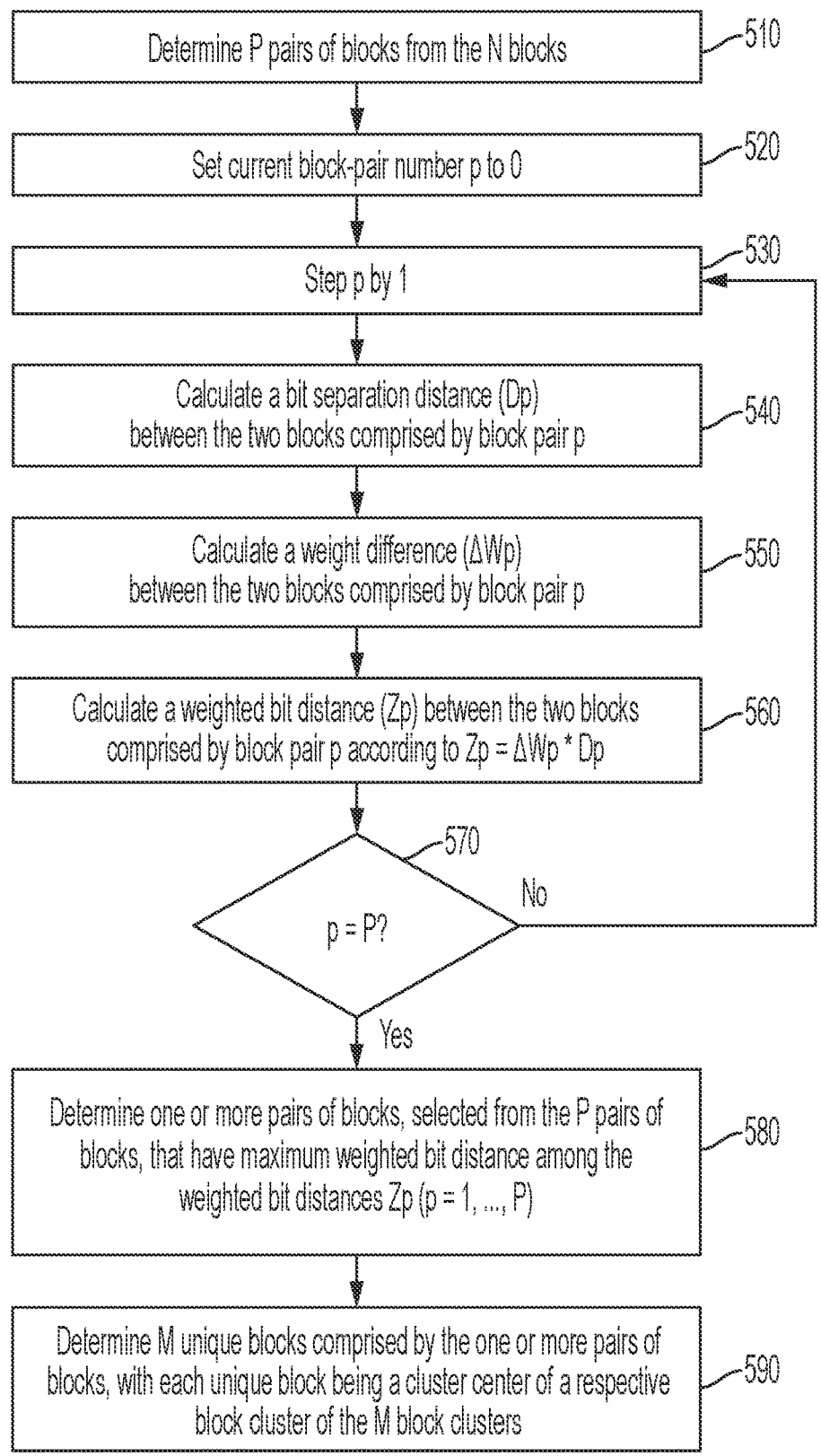
FIG. 5 is a flow chart that describes a process of determining cluster centers for block clusters, in accordance with embodiments of the present invention.
Figure 6:
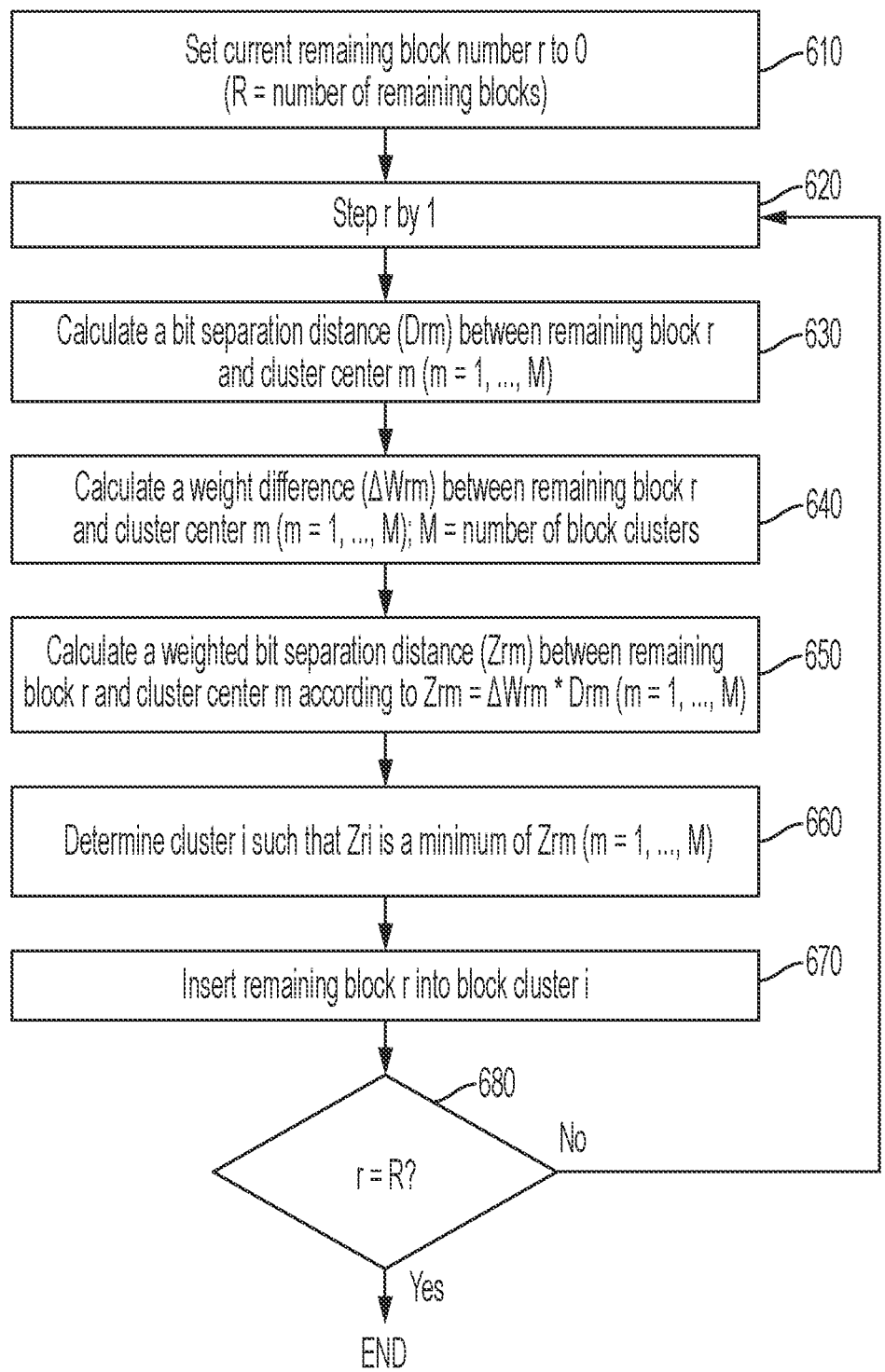
FIG. 6 is a flow chart that describes a process of distributing remaining blocks into block clusters, in accordance with embodiments of the present invention.

Step 50 is described infra in more detail in the flow charts of FIGS. 4-6.

FIG. 4 is a flow chart that describes a process of generating block clusters, in accordance with embodiments of the present invention. The process of FIG. 4 includes steps 410-420.

Step 410 determines M block cluster centers for M respective block clusters, each block cluster center being a unique block of the N blocks, leaving R remaining blocks, wherein M+R=N. Step 410 is described infra in more detail in the flow chart of FIG. 5.

Step 420 distributes the R remaining blocks into the M block clusters. Step 420 is described infra in more detail in the flow chart of FIG. 6.

FIGS. 5 and 6, described infra, utilize a bit separation distance between any two blocks.

For blocks x and y, integer i indexes bit positions of a 1 bit in block x, and integer j indexes bit positions of a 1 bit in block j. The bit separation distance $D_{xy}$ between block x and block y is defined by Equation (1).

$$D_{xy} = \sum ij(\text{ABS}(Pxi - Pyj) - 1) \qquad (1)$$

Pxi denotes bit position i of the 1 bit in block x.
Pyj denotes bit position j of the 1 bit in block y.
ABS denotes absolute value.
Σij denotes summation over i and j.

The term ABS (Pxi−Pyj)−1 in Equation (1) calculates the number of intervening 00 bits between bit position i in block x and bit position j in block y. A 00 bit is defined as a combination of a 0 bit in a bit position in block x and a 0 bit in the same bit position in block y.

For example, let block x represent block 000010 and let block y represent block 010000 in Table 5. Block x has a 1 bit in bit position 5 (i=5), and block y has a 1 bit in bit position 2 in block y (j=2).

Applying Equation 1 results in $Dxy = ABS(5 − 2) − 1 = 2$.

It is noted that two 00 bits intervene (in bit positions 3 and 4) between bit position 5 in block x and bit position 2 in block y, also resulting in Dxy=2.

As another example, let block x represent block 100000 and let block y represent block 001001 in Table 5. Block x has a 1 bit in bit position 1 (i=1), and block y has a 1 bit in bit positions 3 and 6 in block y (j=3 and 6).

Applying Equation 1 results in $Dxy =$ $$ABS(3 − 1) − 1 + ABS(6 − 1) − 1 = 1 + 4 = 5.$$

It is noted that: (i) one 00 bit intervenes (in bit position 2) between bit position 3 in block x and bit position 1 in block and (ii) four 00 bits (in bit positions 2, 3, 4, and 5) intervene between bit position 1 in block x and bit position 6 in block y, also resulting in Dxy=1+4=5.

FIG. 5 is a flow chart that describes a process of determining cluster centers for block clusters, in accordance with embodiments of the present invention. The process of FIG. 5 includes steps 510-590 and describes step 410 of FIG. 4 in more detail.

The process of FIG. 5 iterates over block pairs with one block pair being processed in each iteration.

Step 510 determines P pairs of blocks from the N blocks. Since each pair of blocks consists of 2 blocks, P is calculated as the total number of combinations of 2 blocks selected from the N blocks which is well known in elementary statistics to be $N!/(2!*(N−2)!)=N*(N−1)/2$. Thus $P=N*(N−1)/2$.

For example, if N=5 then P=5*4/2=10 block pair combinations, namely the 10 block pairs combinations of (1,2), (1,3), (1,4), (1,5), (2,3), (2,4), (2,5), (3, 4), (3,5), and (4,5).

Step 520 sets a current block-pair number p to 0.

Step 530 steps p by 1 (i.e., p is replaced by p+1).

Step 540 calculates a bit separation distance (Dp) between the two blocks comprised by block pair p, using Equation (1).

Step 550 calculates a weight difference (ΔWp) between the two blocks comprised by block pair p. If the blocks in block pair p are blocks x and y, then the weight difference (ΔWp) is defined according to Equation (2) as ABS(Wx−Wy).

$$(\Delta Wp) = ABS(Wx − Wy) \qquad (2)$$

Wx and Wy respectively denote the weight of block x and the weight of block y.

Step 560 calculates a weighted bit separation distance (Zp) between the two blocks comprised by block pair p according to Equation (3).

$$Zp = \Delta Wp * Dp \qquad (3)$$

Step 570 determines whether p=P, and if so step 580 is next executed, and if not a next iteration is performed starting at step 530.

Step 580 determines one or more pairs of blocks, selected from the P pairs of blocks, that have a maximum weighted bit separation distance among the weighted bit separation distances Zp (p=1, . . . , P).

Step 590 determines M unique blocks comprised by the one or more pairs of blocks, with each unique block being a cluster center of a respective block cluster of the M block clusters.

Applying the process of FIG. 5 to the 7 blocks (N=7) in Table 5, P=7*6/2=21 block pair combinations. The maximum weighted bit separation distance Zp is found to be Zp=9 for the block pair combination of block 1 (100000) and block 4 (000010).

In step 540, the bit separation distance $D_{xy}$ is calculated via Equation (1) for each of the 21 block pair combinations. In particular, Dxy for the block pair of blocks 1 (100000) and 5 (000010) is calculated via Dxy=ABS (1−5)−1=3.

In step 550, the block weights Wn are assumed to be determined via Wn=n for block n (n=1, 2, . . . , N). Thus, blocks 1, 2, 3, 4, 5, 6 and 7 have block weights of 1, 2, 3, 4, 5, 6 and 7, respectively. The weight difference (ΔWp) for the block pair combination of blocks 1 and 4 is calculated via Equation (2), namely $\Delta Wp=ABS (W_1-W_5)=ABS (1−4)=3$.

In step 560, the weighted bit separation distance Zp for the block combination of blocks 1 and 4 is calculated via Equation (3), namely Zp=ΔWp*Dp=3*3=9.

After Zp has been calculated for the 21 block pair combinations, step 580 determines that Zp for the block pair combination of block 1 and block 4 has the maximum value of Zp among the 21 block pair combinations.

Accordingly, step 590 determines that block 1 is a cluster center of a first block cluster and block 4 is a cluster center for a second block cluster from which it is inferred that M=2.

Generally, M is at least 2 and can exceed 2. For example, the process of FIG. 5 may determine that two block pair combinations (i.e., a first block pair combination and a second block pair combination) have a same maximum value of Zp, so that the two blocks in each of the two block pair combinations are cluster centers of respective block clusters and M can therefore be as high as 4 (i.e., 2+2). If the two block pair combinations do not include a same block, then M=4. If the two block pair combinations include a same block, then M=3.

For example, assume that the first block pair combination is a combination of blocks 2 and 6, and the second block pair combination is a combination of blocks 1 and 5, and that the first and second block pair combinations have a same maximum value of Zp. Then, M=4 defining 4 block clusters with blocks 1, 5, 2 and 6 as respective cluster centers.

For example, assume that the first block pair combination is a combination of blocks 2 and 6, and the second block pair combination is a combination of blocks 2 and 5, and that the first and second block pair combinations have a same maximum value of Zp. Then, M=3 defining only 3 block clusters with blocks 2, 5 and 6 as respective cluster centers.

M is 3 and not 4, because block 2 is in both the first and second block pair combination, so that there are only 3 unique blocks included in the first and second block pair combinations.

FIG. 6 is a flow chart that describes a process of distributing remaining blocks into block clusters, in accordance with embodiments of the present invention. The process of FIG. 6 includes steps 610-680 and describes step 420 of FIG. 4 in more detail.

The process of FIG. 6 iterates over remaining blocks with one remaining block being processed in each iteration. For each remaining block, the process determines into which block cluster the remaining block is to be placed. The number of block clusters (M) and their respective cluster centers were determined by the process of FIG. 5.

Step 610 sets a current remaining block number r to 0 (R=number of remaining blocks).

Step 620 steps r by 1 (i.e., r is replaced by r+1).

Step 630 calculates a bit separation distance (Drm) between remaining block r and cluster center m (m=1, ..., M), using Equation (1).

Step 640 calculates a weight difference ($\Delta$Wrm) between remaining block r and cluster center m (m=1, ..., M), (M=number of block clusters), using Equation (2).

Step 650 calculates a weighted bit separation distance (Zrm) between remaining block r and cluster center m according to Equation (3); i.e., Zrm=$\Delta$Wrm*Drm (m=1, ..., M).

Step 660 determines block cluster i such that Zri is a minimum of Zrm (m=1, ..., M).

Step 670 inserts the remaining block r into block cluster i.

Step 680 determines whether r=R, and if so then the process of FIG. 6 ends, and if not then the next iteration is performed starting at step 620.

In analyzing the example of Table 5, the process of FIG. 5 determined that blocks 1 and 4 are cluster centers of respective blocks of a total of 7 blocks (N=7). Thus, the number of remaining blocks (R) which are not cluster centers is 5 (7 minus 2; i.e., N=M+R). The 5 remaining blocks are blocks 2, 3, 5, 6, and 7.

The two block clusters are denoted as Block Cluster A and Block Cluster B having a cluster center of block 1 and block 4, respectively.

For each of the remaining blocks, the process of FIG. 6 decides whether to insert the remaining block into Block Cluster A or Block Cluster B. Letting Zm1 denote the weighted bit separation distance Zm for block 1, and letting Zm4 denote the weighted bit separation distance Zm for block 4, the remaining block m is inserted into Block Cluster A or Block Cluster B if Zm1<Zm4 or Zm4<Zm1, respectively. If Zm1=Zm4, the remaining block m is randomly inserted into Block Cluster A or Block Cluster B with equal probability based on a random number randomly selected from a uniform probability distribution.

For example, the process of FIG. 6 is next used to determine whether to insert block 3 (001000) into Block Cluster A (cluster center is block 1 (100000)) or Block Cluster B (cluster center is block 4 (000010)).

Since Z34<Z31, block 3 is inserted into Block Cluster B.

Similar calculations are performed for deciding whether to insert each of remaining blocks 2, 5, 6 and 7 into Block Cluster A or Block Cluster B.

After completion of the process of FIG. 6, Cluster A will contain a blocks and Cluster B will contain b blocks, such that a+b=N.

Returning to FIG. 1, step 60 converts the block clusters into word clusters.

Figure 7:
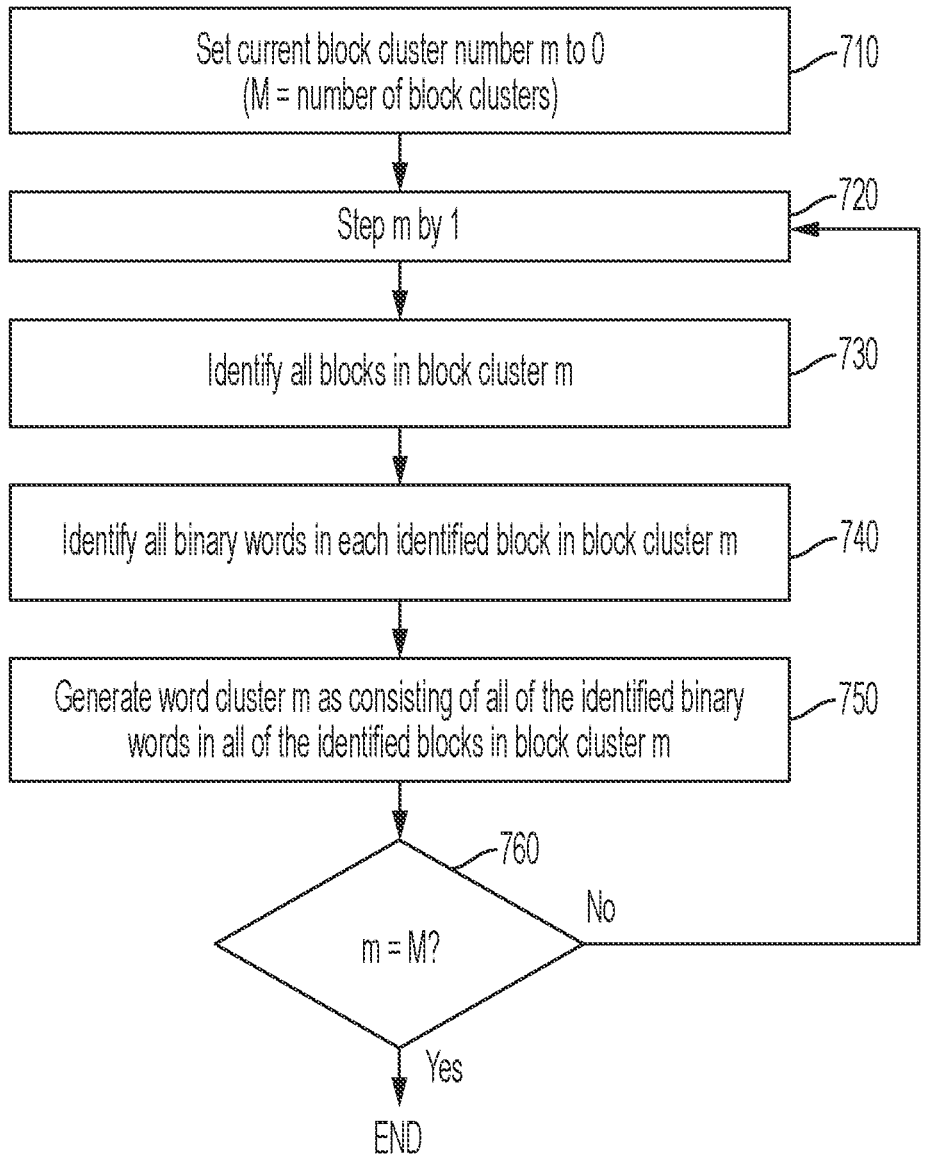
FIG. 7 is a flow chart that describes a process of converting block clusters to word clusters, in accordance with embodiments of the present invention.

FIG. 7 is a flow chart that describes a process of converting block clusters to word clusters, in accordance with embodiments of the present invention. The process of FIG. 7 includes steps 710-760.

Block clusters encompass blocks and word clusters encompass binary words.

The process of FIG. 7 iterates over block clusters with one block cluster being processed in each iteration.

Step 710 sets current block cluster number m to 0 (M=number of block clusters).

Step 720 steps m by 1 (i.e., m is replaced by m+1).

Step 730 identifies all blocks in block cluster m.

Step 740 identifies all binary words in each identified block in block cluster m.

Step 750 generates word cluster m as consisting of all of the identified binary words in all of the identified blocks in block cluster m.

Step 760 determines whether m=M, and if so then the process of FIG. 7 ends, and if not then the next iteration is performed starting at step 720.

For illustrative purposes, it is assumed that N=7 and M=2 (Block Cluster A and Blok Cluster B) as discussed supra.

It is assumed that after the process of FIG. 6 has been completed, Block Cluster A includes blocks 1 and 2, and Block Cluster B includes blocks 3, 4, 5, 6 and 7. Accordingly, it follows from Table 5 that conversion of Block Cluster A and Block Cluster B to Word Cluster A and Word Cluster B, respectively, in accordance with the process of FIG. 7 results in Word Cluster A and Word Cluster B as depicted in Table 6.

TABLE 6

Word clusters converted from block clusters

| Block Cluster | Blocks In Block Cluster | Word Cluster | Binary Words In Word Cluster |
|---|---|---|---|
| A | 1, 2 | A | 100000, 001000, 000001 |
| B | 3, 4, 5, 6 | B | 001000, 000010, 010000, 000100, 010000 |

Returning to FIG. 1, in step 70, for each word cluster, the word cluster is reconfigured into L word clusters in a manner that minimizes a total number of binary word deviations in the L word clusters, wherein L is at least 1.

Figure 8:
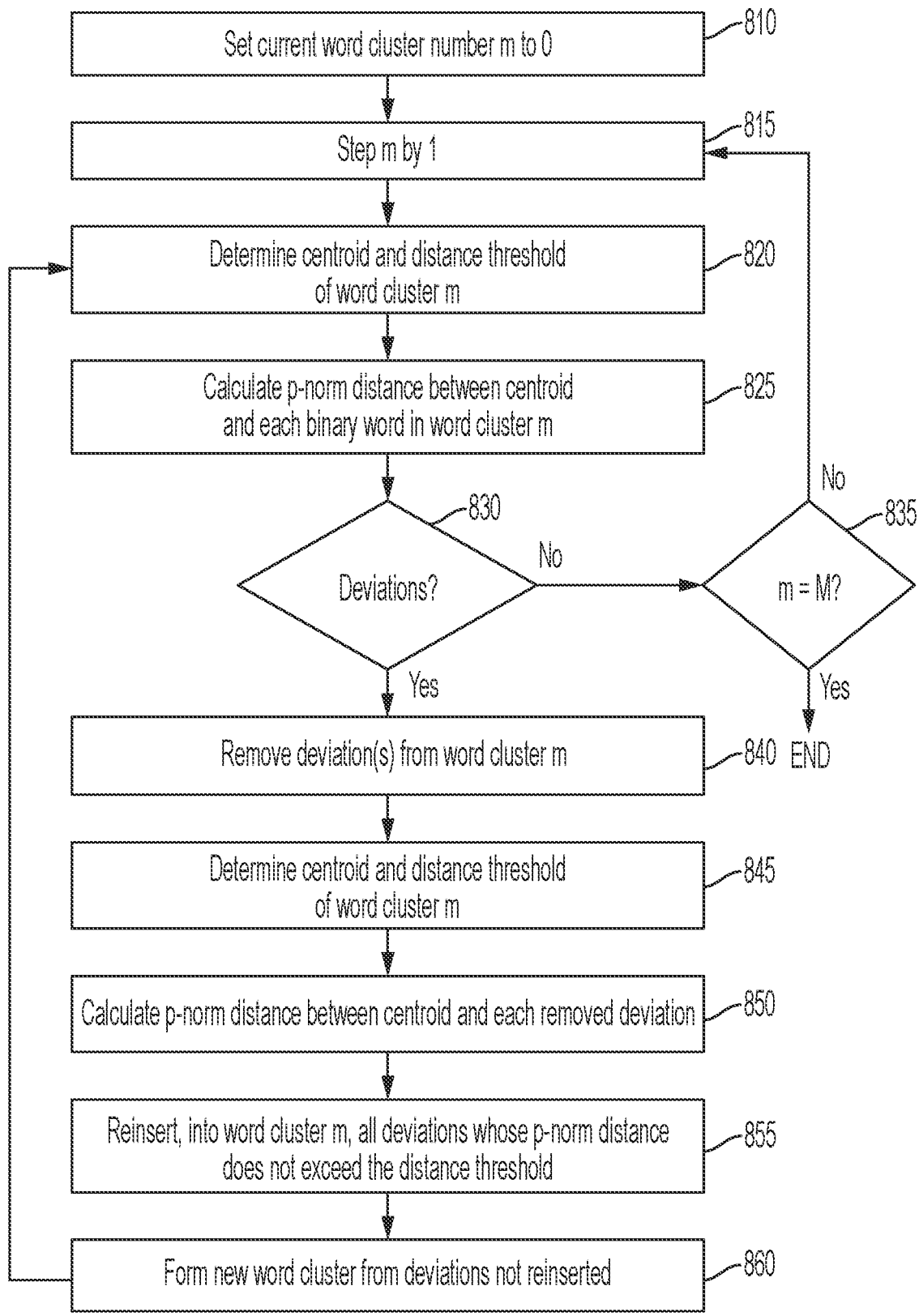
FIG. 8 is a flow chart that describes a process of reconfiguring word clusters, in accordance with embodiments of the present invention.

FIG. 8 is a flow chart that describes a process of reconfiguring word clusters, in accordance with embodiments of the present invention. The process of FIG. 8 includes steps 810-880.

---

For Block Cluster A, $\Delta$Wrm = $\Delta$W31 = ABS(3-1) = 2, and Drm = D31 = (ABS(3-1)-1) = 1, and Zrm = Z31 = $\Delta$W31 * D31 = 2 * 1 = 2.

For Block Cluster B, $\Delta$Wrm = $\Delta$W34 = ABS(3-4) = 1, and Drm = D34 = (ABS(3-5)-1) = 1, and Zrm = Z34 = $\Delta$W31 * D24 = 1 * 1 = 1.

FIG. 8 includes an outer loop 880, wherein each iteration of the outer loop 880 encompasses steps 815, 820, 825, 830, and 835.

Each outer loop iteration processes a different word cluster m by reconfiguring word cluster m into at least one word cluster in a manner that removes deviations from word cluster m and from new word clusters formed from the removed deviations.

A deviation is a data point in a cluster that is an outlier and therefore should not be in the cluster.

More specifically, a deviation in a word cluster is defined as a binary word in the word cluster, wherein the binary word has a p-norm distance from the centroid of the word cluster that exceeds a distance threshold of the word cluster.

The reconfiguration of word cluster m is implemented in an inner loop 870, wherein each iteration of the inner loop 870 encompasses steps 820-860.

Step 810 sets current word cluster number m to 0.

Step 815 steps m by 1 (i.e., m is replaced by m+1).

Step 820 determines the centroid and distance threshold of word cluster m.

The centroid of a word cluster is calculated as follows. Each bit value of the centroid at a bit position is calculated as an arithmetic average of bit values of the binary words in the cluster at the same bit position.

For example, Table 6 shows that the binary words in Word Cluster A are the 3 binary words of: 100000, 001000, and 000001. Thus, the bit values at the bit positions of the centroid of Word Cluster A are as follows.

The centroid bit value at bit position 1 is (1+0+0)/3=1/3=0.33

The centroid bit value at bit position 2 is (0+0+0)/3=0

The centroid bit value at bit position 3 is (0+1+0)/3=1/3=0.33

The centroid bit value at bit position 4 is (0+0+0)/3=0

The centroid bit value at bit position 5 is (0+0+0)/3=0

The centroid bit value at bit position 6 is (0+0+1)/3=1/3=0.333

Table 6 shows that the binary words in Word Cluster B are the 5 binary words of: 001000, 000010, 010000, 000100, 010000. Thus, the bit values at the bit positions of the centroid of Word Cluster B are as follows.

The centroid bit value at bit position 1 is (0+0+0+0+0)/5=0

The centroid bit value at bit position 2 is (0+0+1+0+1)/5=2/5=0.4

The centroid bit value at bit position 3 is (1+0+0+0+0)/5=1/5=0.2

The centroid bit value at bit position 4 is (0+0+0+1+0)/5=1/5=0.2

The centroid bit value at bit position 5 is (0+1+0+0+0)/5=1/5=0.2

The centroid bit value at bit position 6 is (0+0+0+0+0)/5=0

A p-norm distance between a binary word and a centroid is a well known calculation, which is illustrated as follows for binary word 000100 and the preceding centroid (0, 0.4, 0.2, 0.2, 0.2, 0) for Word Cluster B is as follows:

$$p\text{-}norm = [(ABS(0-0))^p + (ABS(0-0.4))^p + (ABS(0-0.2))^p + (ABS(1-0.2))^p + (ABS(0-0.2))^p + (ABS(0-0.2))^p]^{1/p}$$

The parameter p is a positive real number such as, inter alia, 1/3, 1/2, 1, 2, 3, etc.

In one embodiment, the distance threshold of a word cluster is a specified constant threshold.

Figure 9:
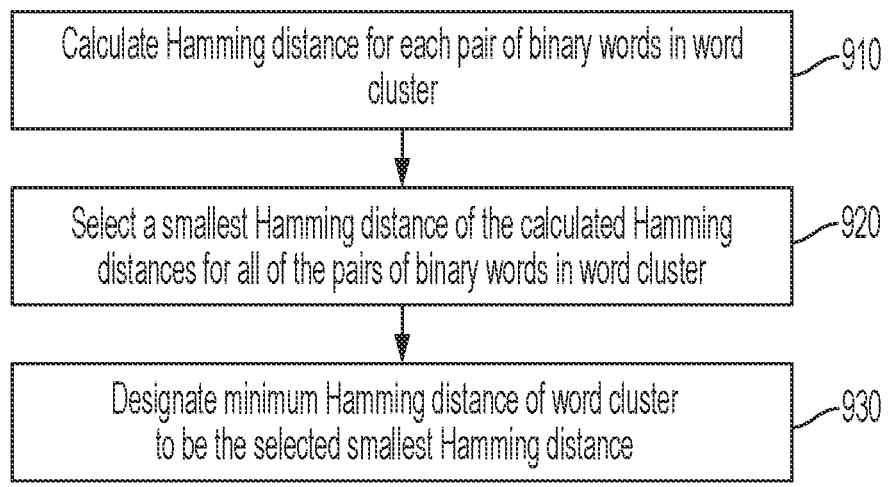
FIG. 9 is a flow chart that describes a process of determining a minimum Hamming distance of a word cluster, in accordance with embodiments of the present invention.

In one embodiment, the distance threshold of a word cluster is a minimum Hamming distance of the word cluster which is determined by the process of FIG. 9

FIG. 9 is a flow chart that describes a process of determining a minimum Hamming distance of a word cluster, in accordance with embodiments of the present invention. The process of FIG. 9 includes steps 910-930.

Step 910 calculates Hamming distance for each pair of binary words in the word cluster.

The Hamming distance for each pair of binary words is the number of bit positions at which the corresponding bits in the two binary words are different.

For example, the Hamming distance for binary words 100000 and 001001 is 3, because the two binary words differ at the three bit positions 1, 3 and 6.

For example, the Hamming distance for binary words 100000 and 000100 is 2, because the two binary words differ at the two bit positions 1 and 4.

Step 920 selects a smallest Hamming distance of the calculated Hamming distances for all of the pairs of binary words in the word cluster.

Step 930 designates the minimum Hamming distance of the word cluster to be the selected smallest Hamming distance.

Returning to FIG. 8, step 825 calculates a p-norm distance between the centroid of word cluster m and each binary word in word cluster m.

Step 830 determines whether there is at least one deviation in word cluster m, wherein each deviation is a binary word whose p-norm distance exceeds the distance threshold of the word cluster.

As stated supra, the distance threshold of word cluster m may be a specified constant threshold or a minimum Hamming distance of the word cluster.

If step 830 determines that there are no deviations, then step 835 is next executed, otherwise step 840 is next executed.

Step 835 determines whether m=M and if so then the process of FIG. 8 ends, and if not the next iteration of the outer loop 880 is performed starting at step 815.

Step 840 removes the at least one deviation from word cluster m.

Step 845 determines the centroid and distance threshold of word cluster m after the at least one deviation has been removed.

Step 850 calculates the p-norm distance between the centroid of word cluster m and each removed deviation.

Step 855 reinserts, into word cluster m, all deviations whose p-norm distance do not exceed the distance threshold.

Step 860 forms a new word cluster from deviations not reinserted in step 855 and the next iteration of inner loop 870 is performed starting at step 820.

Each iteration of the inner loop 870 removes deviations from the current word cluster being processed if any such deviations exist in the word cluster being processed and may form a new word cluster from removed deviations not reinserted into the word cluster being processed.

By forming deviation-free clusters, embodiment of the present invention generate word clusters containing information, configured as binary words, that are separated by small distances which is equivalent to the binary words being logically similar, so that the binary words in the word cluster may be physically stored together to increase the efficiency in the database system by minimizing the numbers of disk accesses to the binary words in the word cluster.

Embodiments of the present invention remove data security and privacy limitations by processing data derived from the original data but not processing the original data itself. The data derived from the original data include binary words, blocks, and both block clusters and word clusters. In contrast, state-of-the-art clustering techniques require processing the original data.

Figure 10:
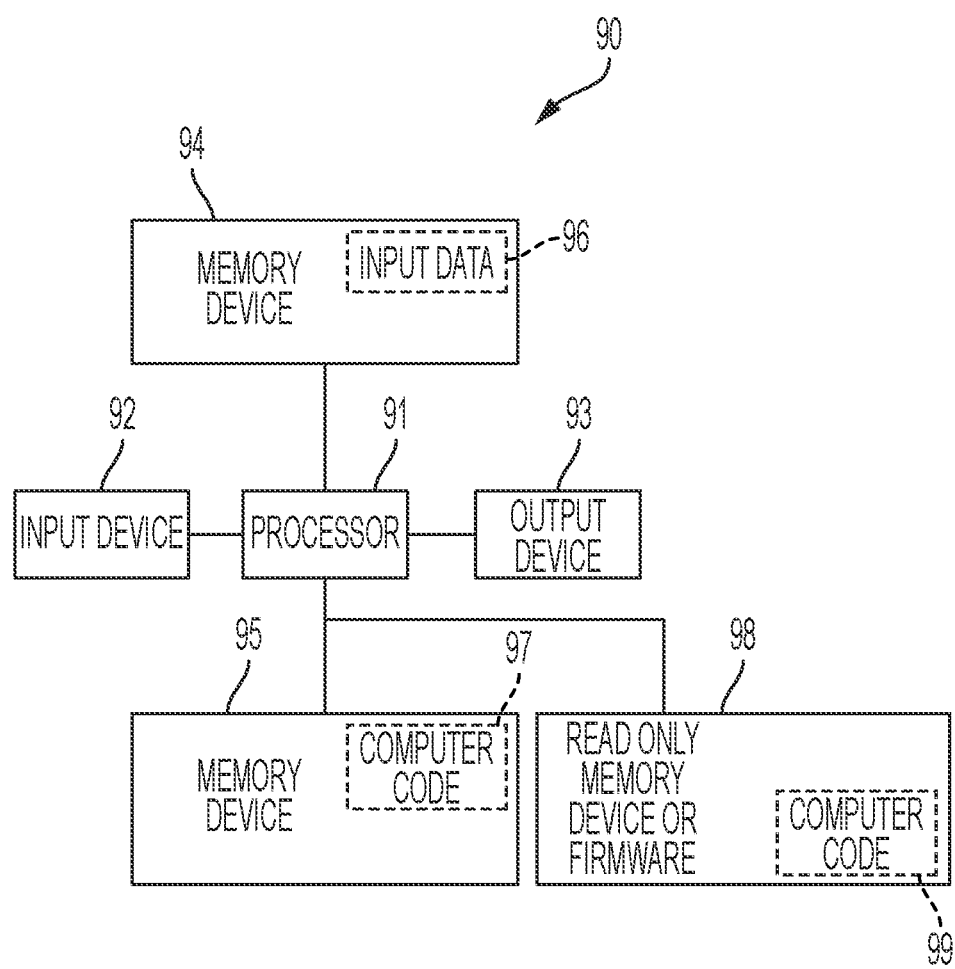
FIG. 10 illustrates a computer system, in accordance with embodiments of the present invention.

FIG. 10 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
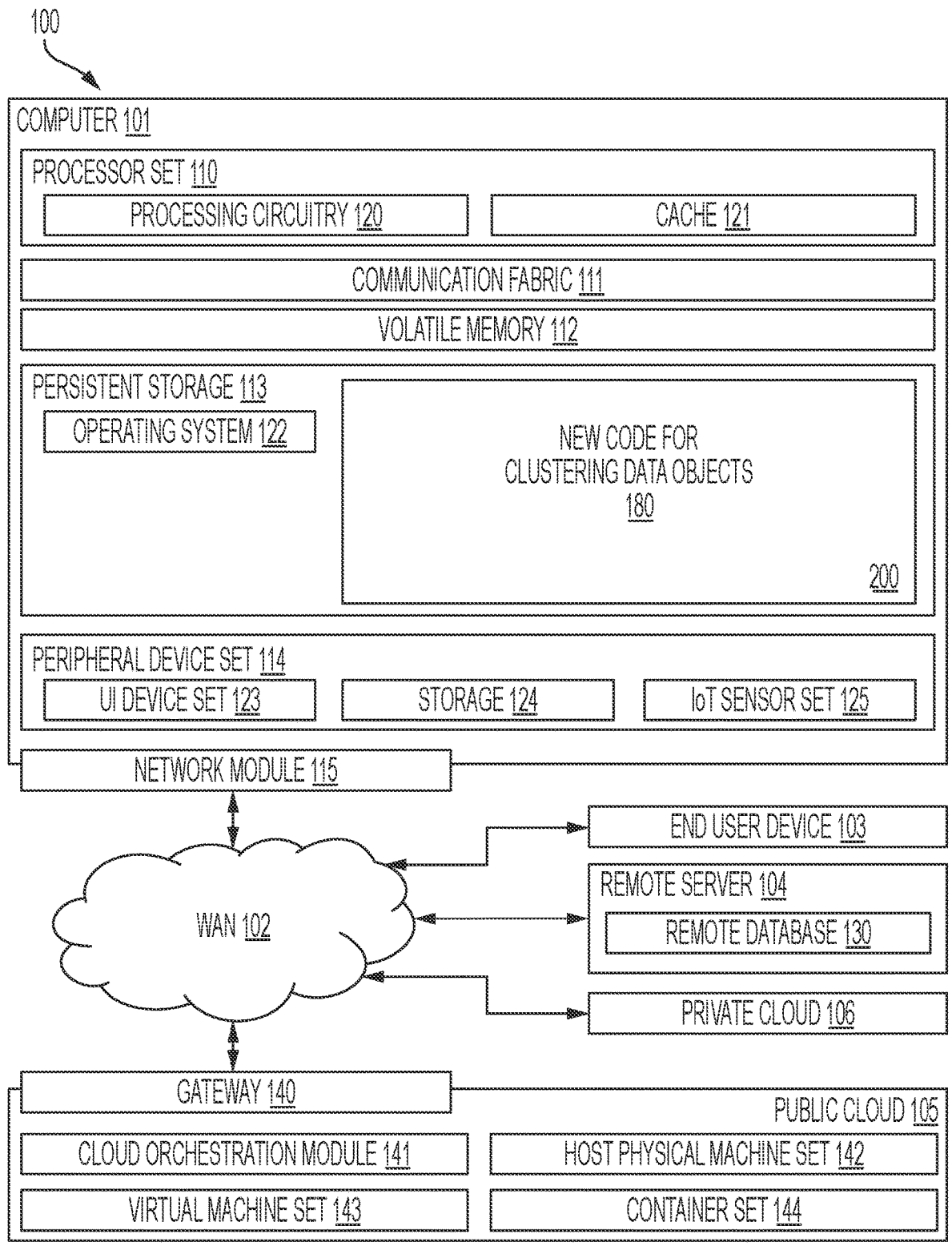
FIG. 11 depicts a computing environment which contains an example of an environment for the execution of at least some of the computer code involved in performing the inventive methods, in accordance with embodiments of the present invention.

FIG. 11 depicts a computing environment 100 which contains an example of an environment for the execution of at least some of the computer code involved in performing the inventive methods, in accordance with embodiments of the present invention. Such computer code includes new code for clustering data objects 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 11. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for clustering data objects, said method comprising:
    accessing, by one or more processors of a computer system, a set of data objects arranged in an initial sequential order, wherein the set of data objects consists of S data objects, wherein S is at least 2, wherein each data object includes a code and a score, wherein each code represents an instance of the data object and each code is a positive integer subject to codes collectively consisting of positive integers 1, 2, . . . , N subject to N≤S, wherein each score is a positive real number denoting a measure of a parameter pertaining to the instance that is represented by the code, wherein scores collectively consist of B unique scores subject to B≤S;
    sorting, by the one or more processors, the data objects using the score as a sort key to rearrange the data objects in an ascending order of the score, wherein each unique score has a sequence number in the sorted data objects, resulting in B consecutive sequence numbers;
    transforming, by the one or more processors, the S data objects into respective S binary words, wherein each binary word corresponding to a data object of the S data objects consists of B bits characterized by: (i) a 1 bit in a bit position of the binary word corresponding to respective sequence number of sorted unique score and (ii) a 0 bit in all other bit positions of the binary word;
    encoding, by the one or more processors, the S data objects into a sequence of N blocks, wherein each block consists of B bits in a binary format, and wherein the N blocks are sequenced and have bit configurations that depend on the initial sequential order of the data objects and the sequence numbers of sorted unique scores;
    generating, by the one or more processors from the N blocks, M block clusters respectively comprising M respective cluster centers, wherein each cluster center is a different block of the N blocks, wherein R remaining blocks of the N blocks are distributed into the M block clusters in a manner that minimizes a weighted bit separation distance between each of the R remaining blocks and each of the M cluster centers, wherein M+R=N, and wherein 2<M<N;
    converting, by the one or more processors, the M block clusters into respective M word clusters of binary words, wherein the S binary words are distributed into the respective M word clusters; and
    for each word cluster of the respective M word clusters having J binary words in each word cluster, reconfiguring, by the one or more processors, an M word cluster, or the respective M word clusters, into L word clusters into which the J binary words are distributed, by minimizing a total number of deviations in the L word clusters, wherein L is at least 1.

2. The method of claim 1, wherein said transforming, the S data objects into the respective S binary words comprises:
    for each current data object of the S data objects:
        initializing all B bits of a binary word corresponding to the current data object to 0; and
        (i) determining the sequence number (b) of the unique score corresponding to the current data object; and (ii) inserting a 1 bit into bit position b of the binary word.

3. The method of claim 1, wherein said encoding comprises:
    setting the B bits of each block of the N blocks to 0; and
    for a current sequence number of the B consecutive sequence numbers, determining one or more codes corresponding to the current sequence number, and for each code of the one or more codes, inserting, in block pointed to by each code, a 1 bit into a bit position pointed to by the current sequence number.

4. The method of claim 1, wherein each block is weighted with a block weight, and wherein said generating M block clusters respectively comprising M respective cluster centers comprises:
    determining P pairs of blocks from the N blocks, wherein P=N*(N−1)/2;
    for each block pair p (p=1, 2, . . . , P), (i) calculating a bit separation distance (Dp) between two blocks comprised by block pair p, (ii) calculating a weight difference (ΔWp) between the two blocks comprised by block pair p, and (iii) calculating a weighted bit separation distance (Zp) between the two blocks comprised by block pair p according to Zp=ΔWp*Dp;
    determining one or more pairs of blocks, selected from the P pairs of blocks, that have a maximum weighted bit separation distance among the weighted bit separation distances Zp (p=1, 2, . . . , P); and
    determining M unique blocks comprised by the one or more pairs of blocks, wherein each unique block is a cluster center of a respective block cluster of the M block clusters.

5. The method of claim 4, said method further comprising:
    for each remaining block r (r=1, 2, . . . , R) and for each cluster center m comprised by block cluster m (m=1, . . . , M): (i) calculating, by the one or more processors, a bit separation distance (Drm) between the remaining block r and the cluster center m, (ii) calculating a weight difference (ΔWrm) between the remaining block r and the cluster center m, and (iii) calculating a weighted bit separation distance (Zrm) between the remaining block r and the cluster center m according to Zrm=ΔWrm*Drm (m=1, . . . , M);
    determining, by the one or more processors, block cluster i such that Zri is a minimum of Zrm (m=1, . . . , M); and
    inserting, by the one or more processors, remaining block r into block cluster i.

6. The method of claim 1, wherein said converting the M block clusters into respective M word clusters of binary words comprises for each block cluster of the M block clusters:
    identifying all blocks in the block cluster;
    identifying all binary words in each identified block in the block cluster; and generating a word cluster consisting of all of identified binary words in all of the identified blocks in the block cluster.

7. The method of claim 1, wherein said minimizing a total number of deviations comprises executing a loop wherein each iteration of the loop comprises:
ascertaining a centroid and a distance threshold for a current word cluster;
calculating a p-norm distance between the centroid and each binary word in the current word cluster;
determining if there is at least one deviation in the word cluster, each deviation being a binary word whose p-norm distance exceeds a distance threshold;
if determined that there is no deviation in the current word cluster then exiting the loop with any remaining removed iterations forming another new word cluster, otherwise:
removing the at least one deviation from the current word cluster;
after said removing, determining a centroid and a distance threshold for the current word cluster;
calculating a p-norm distance between the centroid and each removed deviation;
reinserting, into the current word cluster, all removed deviations whose p-norm distance does not exceed the distance threshold;
forming a new word cluster comprising deviations not reinserted into the current word cluster; and
branching back to said ascertaining to execute a next iteration of the loop with the new word cluster being the current word cluster.

8. A non-transitory computer-readable medium storing a set of instructions for wireless communication, the set of instructions comprising:
one or more instructions that, when executed by one or more processors of a device, cause the device to:
access a set of data objects arranged in an initial sequential order, wherein the set of data objects consists of S data objects, wherein S is at least 2, wherein each data object includes a code and a score, wherein each code represents an instance of the data object and each code is a positive integer subject to codes collectively consisting of positive integers 1, 2, . . . , N subject to N≤S, wherein each score is a positive real number denoting a measure of a parameter pertaining to the instance that is represented by the code, wherein scores collectively consist of B unique scores subject to B≤S;
sort the data objects using the score as a sort key to rearrange the data objects in an ascending order of the score, wherein each unique score has a sequence number in sorted data objects, resulting in B consecutive sequence numbers;
transform the S data objects into respective S binary words, wherein each binary word corresponding to a data object of the S data objects consists of B bits characterized by: (i) a 1 bit in a bit position of the binary word corresponding to respective sequence number of sorted unique score comprised by the data object and (ii) a 0 bit in all other bit positions of the binary word;
encode the S data objects into a sequence of N blocks, wherein each block consists of B bits in a binary format, and wherein the N blocks are sequenced and have bit configurations that depend on the initial sequential order of the data objects and the sequence numbers of sorted unique scores;
generate, by the one or more processors from the N blocks, M block clusters respectively comprising M respective cluster centers, wherein each cluster center is a different block of the N blocks, wherein R remaining blocks of the N blocks are distributed into the M block clusters in a manner that minimizes a weighted bit separation distance between each of the R remaining blocks and each of the M cluster centers, wherein M+R=N, and wherein 2<M<N;
convert the M block clusters into respective M word clusters of binary words, wherein the S binary words are distributed into the respective M word clusters; and
for each word cluster of the respective M word clusters having J binary words in each word cluster, reconfigure an M word cluster, or the respective M word clusters, into L word clusters into which the J binary words are distributed, by minimizing a total number of deviations in the L word clusters, wherein L is at least 1.

9. The non-transitory computer-readable medium of claim 8, wherein the one or more instructions, to cause the device to transform the S data objects into the respective S binary words, cause the device to: for each current data object of the S data objects:
initialize all B bits of a binary word corresponding to the current data object to 0; and
(i) determine the sequence number (b) of the unique score corresponding to the current data object; and (ii) insert a 1 bit into bit position b of the binary word.

10. The non-transitory computer-readable medium of claim 8, wherein the one or more instructions, to cause the device to encode, cause the device to:
set the B bits of each block of the N blocks to 0; and
for a current sequence number of the B consecutive sequence numbers, determine one or more codes corresponding to the current sequence number, and for each code of the one or more codes, insert, in block pointed to by each code, a 1 bit into a bit position pointed to by the current sequence number.

11. The non-transitory computer-readable medium of claim 8, wherein each block is weighted with a block weight, and wherein the one or more instructions, to cause the device to generate M block clusters respectively comprising M respective cluster centers, cause the device to:
determine P pairs of blocks from the N blocks, wherein P=N*(N−1)/2;
for each block pair p (p=1, 2, . . . , P), (i) calculate a bit separation distance (Dp) between two blocks comprised by block pair p, (ii) calculate a weight difference (ΔWp) between the two blocks comprised by block pair p, and (iii) calculate a weighted bit separation distance (Zp) between the two blocks comprised by block pair p according to Zp=ΔWp*Dp;
determine one or more pairs of blocks, selected from the P pairs of blocks, that have a maximum weighted bit separation distance among the weighted bit separation distances Zp (p=1, 2, . . . , P); and
determine M unique blocks comprised by the one or more pairs of blocks, wherein each unique block is a cluster center of a respective block cluster of the M block clusters.

12. The non-transitory computer-readable medium of claim 11, wherein the one or more instructions cause the device to:

for each remaining block r (r=1, 2, ..., R) and for each cluster center m comprised by block cluster m (m=1, ..., M): (i) calculate a bit separation distance (Drm) between the remaining block r and the cluster center m, (ii) calculate a weight difference (ΔWrm) between the remaining block r and the cluster center m, and (iii) calculate a weighted bit separation distance (Zrm) between the remaining block r and the cluster center m according to Zrm=ΔWrm*Drm (m=1, ..., M);

determine block cluster i such that Zri is a minimum of Zrm (m=1, ..., M); and insert remaining block r into block cluster i.

13. The non-transitory computer-readable medium of claim 8, wherein the one or more instructions, to cause the device to convert the M block clusters into respective M word clusters of binary words, cause the device to:

for each block cluster of the M block clusters:
identify all blocks in the block cluster;
identify all binary words in each identified block in the block cluster; and
generate a word cluster consisting of all of identified binary words in all of the identified blocks in the block cluster.

14. The non-transitory computer-readable medium of claim 8, wherein the one or more instructions, to cause the device to minimize a total number of deviations, cause the device to execute a loop wherein each iteration of the loop comprises:

ascertain a centroid and a distance threshold for a current word cluster;
calculate a p-norm distance between the centroid and each binary word in the current word cluster;
determine if there is at least one deviation in the word cluster, each deviation being a binary word whose p-norm distance exceeds a distance threshold;
if determined that there is no deviation in the current word cluster then exiting the loop with any remaining removed iterations forming another new word cluster, otherwise:
remove the at least one deviation from the current word cluster;
determine a centroid and a distance threshold for the current word cluster;
calculate a p-norm distance between the centroid and each removed deviation;
reinsert, into the current word cluster, all removed deviations whose p-norm distance does not exceed the distance threshold;
form a new word cluster comprising deviations not reinserted into the current word cluster; and
branch back to said ascertaining to execute a next iteration of the loop with the new word cluster being the current word cluster.

15. A computer system, comprising:
one or more processors; and
one or more memory devices coupled to the one or more processors, wherein the one or more processors are configured to:
access a set of data objects arranged in an initial sequential order, wherein the set of data objects consists of S data objects, wherein S is at least 2, wherein each data object includes a code and a score, wherein each code represents an instance of the data object and each code is a positive integer subject to codes collectively consisting of positive integers 1, 2, ..., N subject to N≤S, wherein each score is a positive real number denoting a measure of a parameter pertaining to the instance that is represented by the code, wherein scores collectively consist of B unique scores subject to B≤S;

sort the data objects using the score as a sort key to rearrange the data objects in an ascending order of the score, wherein each unique score has a sequence number in the sorted data objects, resulting in B consecutive sequence numbers;

transform the S data objects into respective S binary words, wherein each binary word corresponding to a data object of the S data objects consists of B bits characterized by: (i) a 1 bit in a bit position of the binary word corresponding to respective sequence number of sorted unique score and (ii) a 0 bit in all other bit positions of the binary word;

encode the S data objects into a sequence of N blocks, wherein each block consists of B bits in a binary format, and wherein the N blocks are sequenced and have bit configurations that depend on the initial sequential order of the data objects and the sequence numbers of sorted unique scores;

generate by the one or more processors from the N blocks, M block clusters respectively comprising M respective cluster centers, wherein each cluster center is a different block of the N blocks, wherein R remaining blocks of the N blocks are distributed into the M block clusters in a manner that minimizes a weighted bit separation distance between each of the R remaining blocks and each of the M cluster centers, wherein M+R=N, and wherein 2<M<N;

convert the M block clusters into respective M word clusters of binary words, wherein the S binary words are distributed into the M word clusters; and for each word cluster of the M word clusters having J binary words in each word cluster, reconfigure, by the one or more processors, the M word cluster into L word clusters into which the J binary words are distributed, by minimizing a total number of deviations in the L word clusters, wherein L is at least 1.

16. The computer system of claim 15, wherein the one or more processors, to transform the S data objects into the respective S binary words, are configured to:

for each current data object of the S data objects:
initialize all B bits of a binary word corresponding to the current data object to 0; and
(i) determine the sequence number (b) of the unique score corresponding to the current data object; and (ii) insert a 1 bit into bit position b of the binary word.

17. The computer system of claim 15, wherein the one or more processors to encode, are configured to:
set the B bits of each block of the N blocks to 0; and
for a current sequence number of the B sequence numbers, determine one or more codes corresponding to the current sequence number, and for each code of the one or more codes, insert, in block pointed to by each code, a 1 bit into a bit position pointed to by the current sequence number.

18. The computer system of claim 15, wherein each block is weighted with a block weight, and wherein the one or more processors, to generate M block clusters respectively comprising M respective cluster centers, are configured to:
determine P pairs of blocks from the N blocks, wherein P=N*(N−1)/2;
for each block pair p (p=1, 2, ..., P), (i) calculate a bit separation distance (Dp) between two blocks comprised by block pair p, (ii) calculate a weight difference (ΔWp) between the two blocks comprised by block pair p, and (iii) calculate a weighted bit separation distance (Zp) between the two blocks comprised by block pair p according to $Zp=\Delta Wp*Dp$;

determine one or more pairs of blocks, selected from the P pairs of blocks, that have a maximum weighted bit separation distance among the weighted bit separation distances Zp (p=1, 2, ..., P); and determine M unique blocks comprised by the one or more pairs of blocks, wherein each unique block is a cluster center of a respective block cluster of the M block clusters.

19. The computer system of claim 18, wherein the one or more processors are further configured to:

for each remaining block r (r=1, 2, ..., R) and for each cluster center m comprised by block cluster m (m=1, ..., M): (i) calculate a bit separation distance (Drm) between the remaining block r and the cluster center m, (ii) calculate a weight difference ($\Delta$Wrm) between the remaining block r and the cluster center m, and (iii) calculate a weighted bit separation distance (Zrm) between the remaining block r and the cluster center m according to $Zrm=\Delta Wrm*Drm$ (m=1, ..., M);

determine block cluster i such that Zri is a minimum of Zrm (m=1, ..., M); and insert remaining block r into block cluster i.

20. The computer system of claim 15, wherein the one or more processors, to convert the M block clusters into respective M word clusters of binary words comprises for each block cluster of the M block clusters, are configured to:

identify all blocks in the block cluster;

identify all binary words in each identified block in the block cluster; and generate a word cluster consisting of all of identified binary words in all of the identified blocks in the block cluster.

\* \* \* \* \*